May 11, 1943.  W. P. YANT  2,318,827

VALVE

Filed March 3, 1941   3 Sheets-Sheet 1

INVENTOR.
WILLIAM P. YANT
BY Frank E. Foote
ATTORNEY.

May 11, 1943.   W. P. YANT   2,318,827
VALVE
Filed March 3, 1941   3 Sheets-Sheet 2
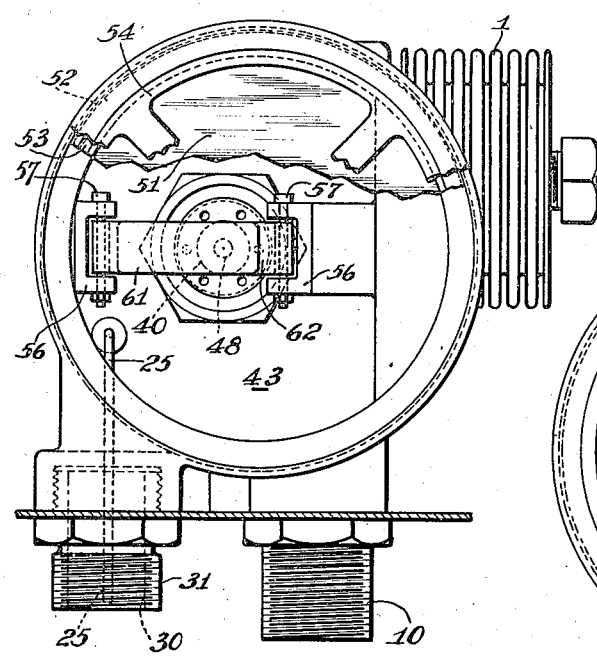
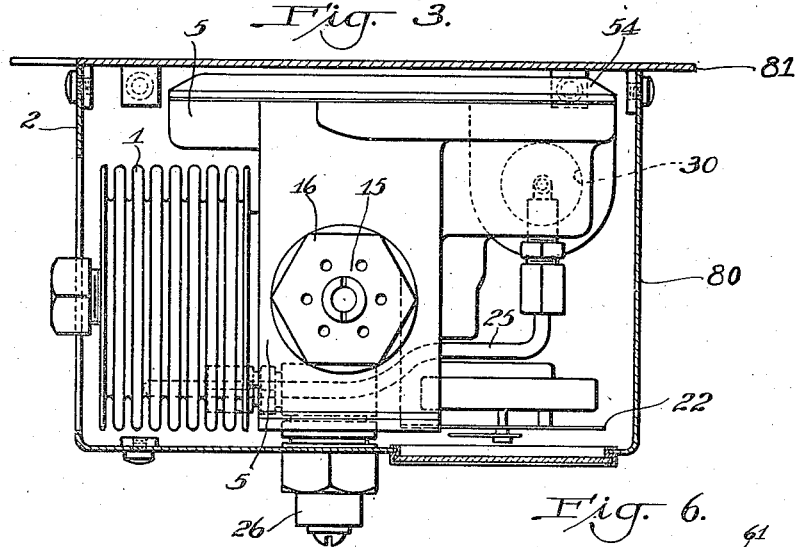
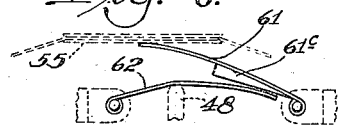
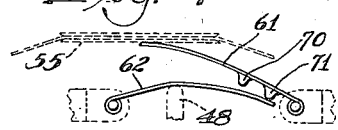
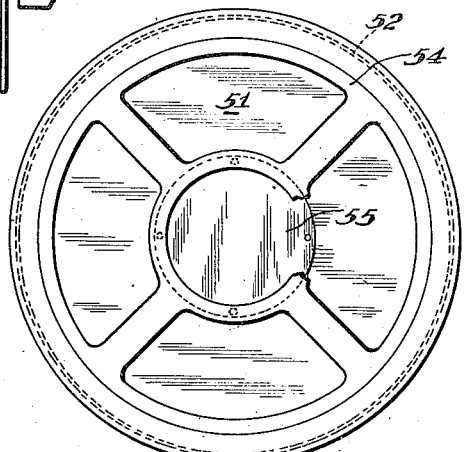
INVENTOR.
WILLIAM P. YANT
BY
ATTORNEY.

May 11, 1943.     W. P. YANT     2,318,827
VALVE
Filed March 3, 1941     3 Sheets-Sheet 3
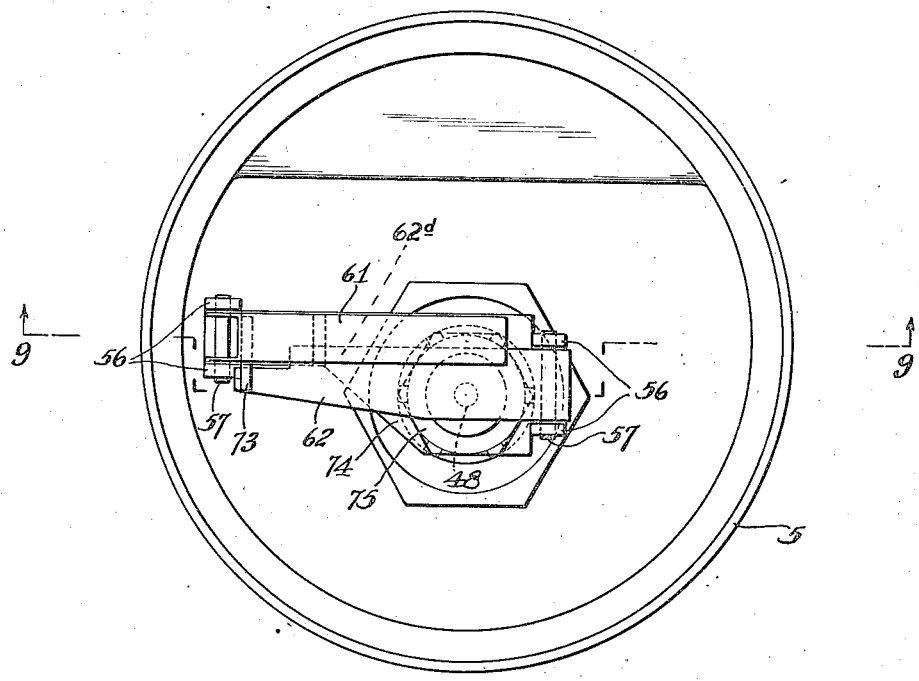
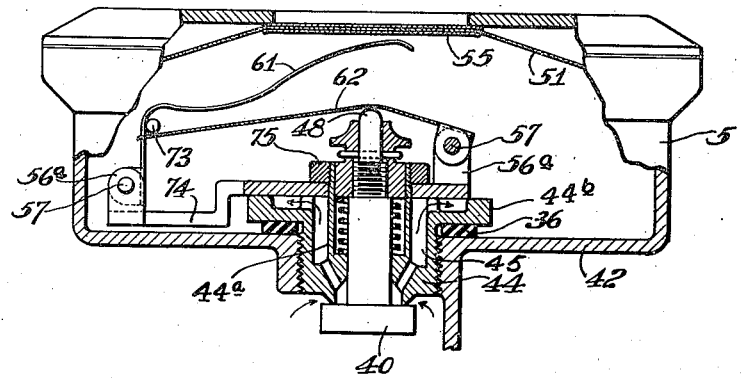
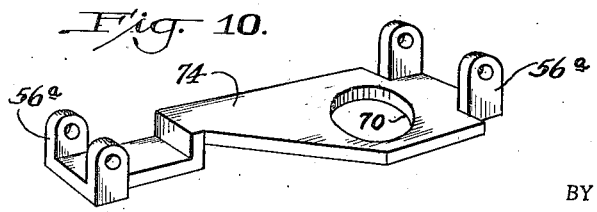
INVENTOR.
WILLIAM P. YANT
BY
Frank E. Foote
ATTORNEY.

Patented May 11, 1943

2,318,827

UNITED STATES PATENT OFFICE 2,318,827

VALVE

William P. Yant, Murraysville, Pa., assignor to Mine Safety Appliances Company, Pittsburgh, Pa.

Application March 3, 1941, Serial No. 381,513

4 Claims. (Cl. 137—153)

This invention relates to a fluid pressure reducing valve and, more particularly, to a mechanism operative as a regulator valve to supply respirable air for human consumption at suitable pressures from a relatively high pressure source and responsive to pressure of respiration to effect proper control of the supply of air only during periods of demand.

Any reducing and control valve or, more specifically, a valve actuating mechanism responsive to changes in pressure in a respiration cycle to supply air at a suitable pressure and only during the period of inhalation represents a most extreme condition for actuating a valve. The mechanism must respond to these minute changes in pressure in order to provide and interrupt the supply of air during the cycle and to maintain fluid supplied within the small range of all allowable pressure variation. Apparatus is available which provides such results, but any such apparatus is of a complicated mechanical nature, of an expensive construction and of a bulky nature, which characteristics limit its use and make it unadaptable for the purpose of this invention.

It is among the objects of the invention to provide a fluid pressure regulating valve which is adaptable to supply respirable air at a fraction of an inch of water pressure from a high pressure source and functioning on the demand principle of supply, which is compact and rugged in construction, simple in operation, light in weight, and of a size readily and conveniently transportable by the user, if necessary, and which is adaptable to breathing equipment used for supplying air for respiration.

Apparatus of the type concerned in this invention employs a two-stage pressure reduction and includes a pressure responsive means that provides an intermediate pressure condition serving as a source of operation for a low pressure reducing valve. The low pressure valve is operated by the pressures of respiration and as each complete cycle for each respiration is relatively short, it is necessary to provide a responsive means which is quick acting in operating the valve. Furthermore, the low pressure valve is usually positioned in the intermediate or relatively high pressure chamber to utilize the higher pressure to hold the valve closed when the valve is moved to this position by the responsive element. For respiratory apparatus, this arrangement is quite advantageous since the pressure differentials acting on the responsive element are low and unless utilized would require some form of a heavy resilient member or means having sufficient strength to hold the valve in the closed position against the pressure in the intermediate chamber until actuated by the responsive element. However, this arrangement requires greater force to initially open the valve. In the event a constant pressure or force is applied to the valve, it is necessary to build up the force before the valve can be initially opened and this condition, obviously, produces resistance to breathing.

It is a more specific object of this invention to provide a valve actuating mechanism operated by a pressure responsive means and adaptable to increase materially the pressure applied by the responsive means to overcome instantly pressure opposing movement of the valve and adaptable further to increase the movement transferred to the valve after initial opening to effect a quick opening movement in operating the valve.

Other objects of this invention will become apparent from a detailed description of my invention and the novel features of which are set forth in the appended claims.

In the drawings, Fig. 1 is a sectional view taken along the line 1—1 of Fig. 2 of a preferred embodiment of my invention;

Fig. 3 is a plan view of the embodiment and illustrates the compactness of the apparatus and its adaptability as a portable means for supplying a fluid such as respirable air;

Fig. 4 is a rear elevational view of the embodiment with a portion of the outer parts removed for the purpose of illustrating the valve actuating lever system employed in the low pressure chamber;

Fig. 5 is a detailed view of the parts shown fragmentarily in Fig. 4;

Fig. 6 is a diagrammatic illustration of a modification of the valve actuating lever system illustrated;

Fig. 7 is a diagrammatic illustration of another arrangement of a valve actuating lever system;

Fig. 8 is a rear elevational view of another embodiment of a valve and actuating assembly;

Fig. 9 is a side view in elevation with the housing broken away and a section taken along the line 9—9 of Fig. 8; and Fig. 10 is an elevational view of the lever support illustrated in the embodiment.

Figure 1:
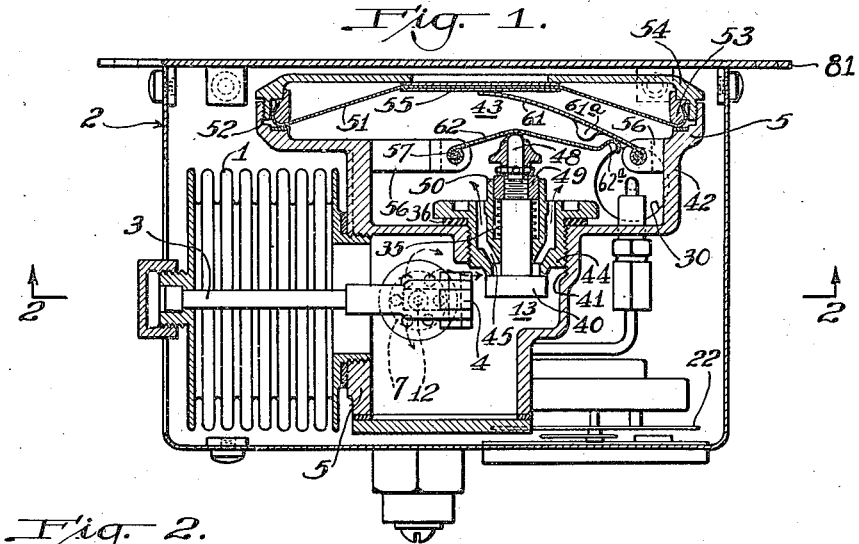

The preferred embodiment illustrated, which is an application of the invention as a suitable and improved oxygen supply regulator attachable to breathing apparatus of the types commonly used for this purpose, includes a complete two-stage pressure reduction mechanism and has been successfully operated in converting a pressure of several hundred pounds to a fraction of an inch of water and as a demand valve for supplying air for respiration. Any of the outside dimensions of this mechanism measures less than six inches and the weight is such that the assembly is conveniently portable. For the purpose of fully describing such an apparatus and to appreciate the problem involved, that portion of the apparatus relating to the intermediate stage is illustrated and will be described, although by this description it is not intended that it be inferred as a limitation of its application.

A respiratory apparatus of the demand type operates on the principle of supplying oxygen during the inhalation phase or step in the cycle of breathing and closing off the supply during the exhalation phase. In view of the short time of each cycle and the parts or phases of each cycle, it is necessary that the apparatus be quickly responsive to the small differences in pressure that exist to supply oxygen sufficiently to eliminate discomfort and physical disturbance, if excessive, that may result from resistance to breathing. For the purpose of satisfying this condition, it is necessary that a pressure responsive actuating mechanism open a valve at a pressure of less than an inch of water and be capable of supplying a flow of about 20 liters per minute to fulfill a normal individual demand and to be operative to close the valve at a slightly greater pressure as would be produced by exhalation. This functioning of the responsive mechanism to close off the valve by the pressure of exhalation is important to conserve the oxygen supply as much as possible and as a matter of protection in preserving the seal of the facepiece. Furthermore, a practical supply apparatus should be similarly operative at temperatures below zero degree centigrade as well as temperatures at the other extreme.

One feature of this invention is to provide a responsive apparatus to operate a valve which is capable of responding quickly to inhalation to open a valve and deliver the full requirements of breathing in order that little or no resistance is offered and at extreme temperatures which may be encountered and, also, to respond to a small change in the pressure to completely close the valve and eliminate as much waste as possible.

Referring to Figs. 1 to 5, the preferred embodiment illustrated is a two-stage regulating valve 2 in which respirable air or oxygen at high pressure is passed through a high pressure reduction state controlled by a pressure responsive means illustrated as a Sylphon 1 mounted onto a housing 5. The Sylphon is a cylindrical corrugated tube closed at its outer end, which is free to move, and having its interior open to receive fluid to exert pressure on the outer end of the tube. The outer end carries a link 3. This link extends inwardly of the tube and having its other end connected pivotally to a valve actuating lever 6 pivotally mounted onto an inner partition 8, which forms an intermediate pressure chamber 13. This lever engages a high pressure valve 7. An inlet 10 of the housing is to be connected to the source of air at high pressure such as used in storing respirable air and a passage 11 formed in the housing and leading from the inlet is connected to an opening 12 in the inner partition 8 and is thus connected to the intermediate chamber 13. In this opening 12 is placed the pressure reducing valve 7 which is positioned by a spring 14 in an open position and is closed by the responsive movement of the Sylphon and the interconnected lever system.

The principal feature of this invention is the mechanism employed to provide a low pressure supply for respiration with the air in the chamber 13 as the source. A low pressure valve 40 is operatively positioned in an opening 41 in another partition 42 of the housing that forms the low pressure chamber 43 within the housing 5. An outlet connection 31 having an outlet passage 30 connected to the low pressure chamber is to be connected to a facepiece worn by the user or to any other type of breathing apparatus where the results of my improved valve can be utilized. The valve 40 is preferably positioned so that the valve head is located in the intermediate pressure chamber 13 and is held in closed position by the greater pressure in the chamber 13 and it is arranged to move into this chamber when moved to an open position. The valve itself is positioned in a valve casing 44 which is threaded to the partition 42 to close off the opening 41 and in which is contained ports or passages 45 controlled by the valve in engaging a seat provided on the casing. A yieldable washer 36 seals the casing to the partition. At the lower end of the valve is an abutment 48 integral with the valve to serve as an engaging surface for a pressure responsive actuating mechanism that constitutes an important part of my invention. The valve carries a collar 49 that is slidable onto a guide 50 formed in the valve casing and is operative to maintain the valve in a freely moving condition during its operation. A return spring 35 acts against the collar 49 to position normally the valve in a closed position. This is advantageous since the responsive mechanism is free from engagement with the valve and any failure in the mechanism does not interfere with the closing of the valve and a conservation of the supply of air. When the valve is open, the pressure of the intermediate chamber acts on both sides of the valve head and a spring of small tension can be used to close the valve. When the valve is closed, the pressure in the intermediate chamber is sufficient to hold the valve in a tight sealed position.

A diaphragm 51 closes off an opening 52 provided in the housing 5 and defines a portion of the low pressure chamber and is subjected to the pressure within the chamber which is the chamber in which the respiration pressures exist. This diaphragm is supported by a frame 54 threaded to the housing and which carries a removable metal support 53 on which the diaphragm is mounted and is then pressed into the frame 54. The diaphragm has a metal disc 55 in its central portion to operate as a bumper plate in engaging a valve. The low pressures involved in inhalation and the limited area of the diaphragm make the diaphragm itself incapable of moving the valve against the higher intermediate pressure or force acting or opposing movement of the valve and some means is required in magnifying or increasing the force or pressure exerted to move the valve to an open position. This mechanism is to be operative to produce such a magnitude of force from the low values of pressure produced by inhalation of an individual. Interposed between the plate and the abutment 48 is a valve actuating mechanism responsive to the pressure exerted by the diaphragm and operative to move the valve quickly to an open position and against the pressure in the intermediate pressure chamber. This mechanism is effective to multiply the pressure exerted by the diaphragm and at the same time modify its operation during the movement so as to give a quick opening action. The area of the responsive element or diaphragm in the embodiment required to give sufficient responsiveness in operating the valve is not large for use as a regulating valve for respiration and is distinctly advantageous in making a compact apparatus. This feature of compactness is of considerable significance in breathing apparatus, especially when it may be necessary to transport the apparatus by the individual using it. The position of the diaphragm against the frame represents the closed position of the valve and a reduction in pressure in the chamber 43 such as the suction produced by inhalation causes the diaphragm to be moved inwardly toward the valve.

By employing the principle of mechanical advantage the movement imparted to the actuated valve is much less than the actual movement of the diaphragm. With my invention the advantage is greatest in initially opening the valve while further movement of the diaphragm lessens the advantage and increases the actual movement transferred in order to give quick action in moving the valve to an open position adequate to supply the flow necessary.

To provide this increase in force or pressure, a system of levers 60, Figs. 1 and 4, is employed and this comprises a pair of oppositely directed pivoted levers 61 and 62 which in this embodiment are each mounted onto a bifurcated support element 56 of the partition by means of a pin 57 and each extends in the direction of the abutment 48 of the valve. By proper arrangement of the levers and their engagement, the system will increase the pressure applied by the diaphragm in opening the valve. While a diaphragm is illustrated as the pressure responsive means, other means such as a Sylphon may be used.

An upturned end 62a of the inner lever engages the outer lever at or near its pivotal connection to the housing while the valve abutment engages the inner lever nearer its pivotal connection. The free ends of the levers are disposed normally above the mounting horizontally of the levers onto the partition, although the free end of the inner lever is positioned above only a small amount in order to impart the maximum downward movement to the valve by a unit movement of the lever. It is believed apparent that the resolved downward movement of the lever is greatest for a unit degree movement of the lever when the lever is about its horizontal position. Also, preferably the free end of the inner lever is normally positioned horizontally slightly above the connection of the outer lever to its support. This desirable disposition of the levers produces a large downward component of the valve engaging surface of the inner lever 62 upon movement of the diaphragm. The curved shape of the inner lever provided for engagement with the abutment gives better action in moving the valve as well as disposing the engageable end near its horizontal position to gain maximum resulting movement transferred to the lever. The angular disposition of the outer lever relative to the inner lever accommodates a change in amount of mechanical advantage as the levers move to open the valve and which will be understood by further description.

An indent 61a is formed integral with the outer lever 61 and in its under surface and located inwardly of its mounting to move the point of engagement of the levers toward the valve as the levers move downwardly. This action produces greater movement to the valve by a unit movement of the diaphragm while lessening the advantage in force produced only an immaterial amount. After the force produced by the pressure in the intermediate chamber is overcome by initially opening the valve and equalizing such pressure, the only pressure opposing further opening of the valve is the resilient spring member. Consequently, the decrease in force applied to the valve does not inhibit further opening of the valve and actually the decrease is offset by the less force required to continue opening of the valve. In addition, the feature of quick action in moving the valve to an open position by the alteration in the lever arrangement due to the change in engagement of the levers reduces very materially the resistance ordinarily encountered in the slowness of operation of the valve in opening.

To show more specifically the complete operation of my improved valve, a description of its complete cycle of operation will be given. Movement of the diaphragm into the low pressure chamber 43 forces the bumper plate against the outer lever and this force or pressure is magnified several times by transfer through the lever system and this becomes sufficient to initially open the valve against the intermediate pressure in the chamber 13. The initial movement of the lever system produces the maximum force advantage and this operative condition coincides with the requirement of operation of the valve. Further movement of the diaphragm and consequent movement of the lever system causes the engagement of the inner lever with the outer lever to move toward the pivotal point of the inner lever by the engagement of the indent 61a of the outer lever with the inner lever. Thus, as the levers move downward, their engagement moves toward the pivotal connection of the inner lever, and this increases the movement imparted to the inner lever by the diaphragm through the outer lever and consequently increases the movement to the valve or the rate of opening of the valve. This is advantageous because after initial movement of the valve the pressures operating on the valve head are somewhat equalized and less force, that required to move against the restoring spring, is needed and the increased rate of movement causes the valve to move more quickly to a full open position. A feature of this invention is to provide such a means operated by a pressure responsive means which will produce sufficient amplification of pressure of the responsive means to crack or initially open the valve and subsequently provide an increased rate of movement in opening the valve over the initial rate of movement.

The application of this embodiment as a supply valve for controlling a flow of respirable air is simple and yet effective to give the result desired in actuating the valve on the demand principle. Inhalation depresses the diaphragm and draws the bumper plate against the outer lever. Due to the mechanical advantage available, even though this drawing action or pressure is of low magnitude, it is sufficient to move the valve against the pressure in the intermediate chamber and the restoring spring until the effect of the pressure on the intermediate chamber is equalized. Continued pressure and movement of the diaphragm reduces the mechanical advantage but is of sufficient extent to move the valve against the resilient spring while the rate of movement upon exhalation increases to almost instantly open the valve. Thus, the demand of inhalation is quickly supplied and upon exhalation the diaphragm is moved outwardly by exhalation and away from the lever system so that the restoring spring is free to instantly close the valve. Subsequent inhalation starts the cycle of operation over again. The valve is thus operated by demand and the responsiveness and operation of the responsive mechanism produces instant action so as to fulfill quickly the volume requirements to satisfy the suction of inhalation and to close the valve by exhalation. It is important that a valve suitable for respiration must be effective in closing the valve by exhalation since any retardation in exhalation would be unsatisfactory from the comfort standpoint and result in a waste of available respirable air.

For the purpose of protection in the apparatus as a whole and to include a full and complete description of apparatus which is being supplied in quantities proving its practical and operative advantages, a safety valve 15 is mounted in an outer wall of the housing and within the intermediate chamber 13 to prevent any undue build-up in pressure which would interfere with the operation of the low pressure demand supply mechanism. This safety valve 15 is composed of a valve casing 16 that is fitted into an opening 18 in the housing chamber and in which is inserted a pressure loaded valve 17. After considerable experimentation, it has been found desirable to adjust the Sylphon to maintain a pressure of about five pounds in the intermediate chamber in order to properly adequately supply air to the low pressure chamber. It is also desirable to insert some form of a filter 20 in the high pressure passage 11 of the housing to remove any foreign matter in the fluid introduced. A gage 22 is connected to the inlet passage 12 and thus indicates to the user the available supply of high pressure air remaining.

Figure 2:
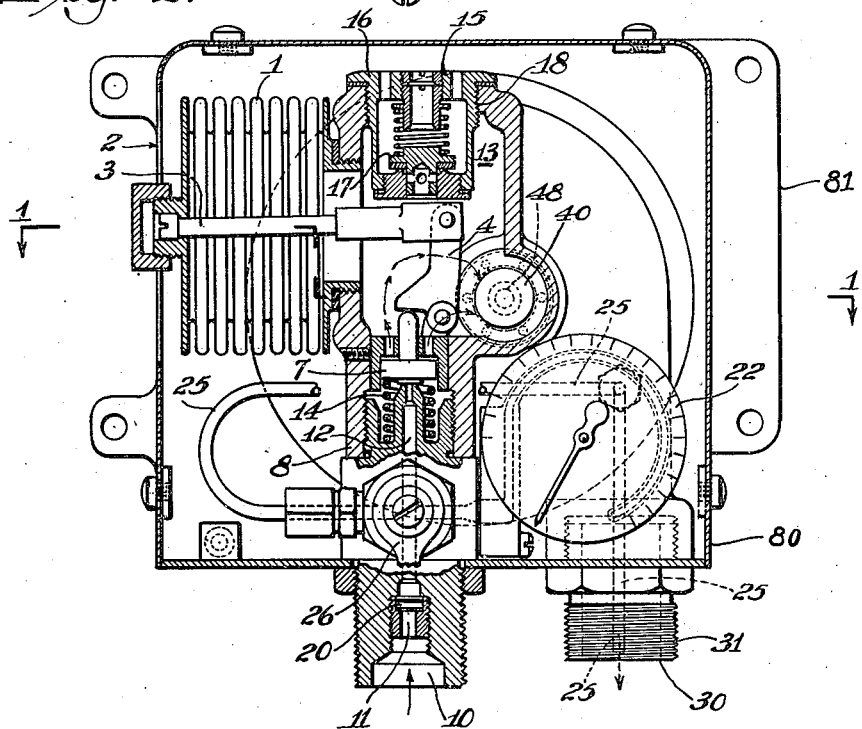
Fig. 2 is a sectional view taken along the line 2—2 of Figs. 1 and 3.

In apparatus of this type, a by-pass 25 of the regulator, Fig. 2, is incorporated and controlled by a valve 26 which connects the inlet passage 12 directly to the outlet 30 of the housing. This by-pass is made of a comparatively small size tube and it has been found desirable to insert the tube through the outlet connection 31 of the housing and then extend in a down-stream direction for a short distance as illustrated. This is to eliminate any interference of discharge from the by-pass with the responsive element in the low pressure chamber. The whole assembly is supported in a case 80 to which a mounting bracket 81 is integrally jointed. This particular manufacture is especially designed for aviation purposes and the advantages of compactness, lightness and sensitivity are of great value. This same apparatus is designed to be used without being permanently supported such as by using it as a protective device to be carried by an individual.

Other modifications can be made in the lever assembly such as by forming or applying a triangular shaped abutment on the outer lever 61 such as illustrated in Fig. 6. The same characters are used in this modification for the purpose of simplicity. In this instance, the inner lever 62 should have sufficient curvature so that as it moves downward the engagement of the levers is moved in the direction of the pivotal mounting of the inner lever. An advantage is that the change in resulting movement imparted to the valve during movement of the diaphragm 51 is gradual and depends on the slope of the engageable under surface of the outer lever. This action gives greatest mechanical advantage at the beginning of the cycle and reduces itself by the change of the distance of lever engagement from the pivotal connection of the inner lever to increase the movement of the valve after the initial movement of the valve. Another arrangement is illustrated in Fig. 7 in which the outer lever 61 has a pair of indentations 70 and 71 formed in its under engaging surface. The inner indent 70 is of smaller size than the other and as the inner curved lever moves downwardly the point of engagement with the outer lever is transferred from the outer indent 71 relative to the inner lever which is the larger to the smaller and inner indent 70.

In the above embodiments the levers have been mounted directly on to the regulator housing and it has been found to be advantageous in some respects to modify this arrangement and provide a separate mounting for the levers which is attached to or supported directly by the valve casing 44. One application of this idea is illustrated in Figs. 8, 9 and 10 in which a flat or frame member 74 has an opening 70 to accommodate the inner tubular portion 44a of the valve casing and is supported directly by an outer portion 44b of the casing. The valve casing 44 is sealed to the housing by means of the washer 36. For the purpose of holding this member tightly on the casing, the nut 75 is provided and is threaded to the upper extent of the portion 44a. Integral with this member 74 are the lever supports 56a to which the levers are mounted by means of the pins 57, this mounting being the same as provided in the other embodiment. By this arrangement, a lever system can be provided which increases to a certain extent the amount of mechical advantage realized in the previous embodiments. The outer lever 61 carries a pin 73 that is welded to the under surface of the lever and positioned almost directly above the pivotal connection of the lever to its support and arranged to engage the free end of the inner lever 62. Intermediate the connection of the pin to the outer lever and its engagement with the diaphragm is a downwardly directed portion which is arranged to engage a widened portion 62d of the inner lever and as the outer lever moves about its support, its engagement with the inner lever moves from the pin to the downwardly directed portion and accomplishes the change of advantage in applying pressure and causing movement of the valve.

The advantage of this modified arrangement of the lever assembly and its support within the low pressure chamber is that by simply removing the nut 75 from the valve casing the whole lever assembly can be removed. This is desired, in some instances, to make certain adjustments to the levers and allows more freedom in any repairs to the valve itself.

The oppositely disposed levers positioned in relation to a valve and a responsive element and constructed to provide the desired results of advantage and movement in actuating a valve can be supplied to other purposes where fluid pressure control is desired by means of opening and closing a valve. However, the application of this principle to the manufacture of a control valve for supplying respirable air is of some consequence because of the rigid requirements for such a supply valve and especially the discovery that with this principle of operation a mechanism can be made having such sensitivity that improved results in operation are obtained giving more satisfaction and comfort to the user.

I have explained the principle and mode of operation of my invention, and have illustrated what I now consider to represent its best embodiment, application and some modifications thereof. However, I desire to have it understood that, within the scope of the appended claims, the invention may be practiced otherwise than as specifically illustrated and described.

I claim:

1. In a respiratory oxygen regulator including a housing having a fluid passage, an inlet and an outlet opening connected to the passage, the inlet opening being connectable to a source of oxygen and the outlet opening being connectable to a facepiece, a partition in the passage to define an outlet chamber connected to the outlet opening and having an opening therein, a normally closed valve in the opening and having a portion extending into the outlet chamber, a pair of levers pivotally supported to the housing and having their free ends oppositely directed and adapted to overlie each other, the inner lever engaging the valve and having its free end engaging the outer lever near its pivotal connection to the housing, each lever support being in substantially transverse alignment, each lever extending above its support when in normal position, a diagphragm means in the outlet chamber and having a predetermined area subjected to pressure in the outlet chamber and adapted to be moved inwardly during inhalation, the free end portion of the outer lever being arranged to engage the diaphragm, a fulcrum means between the levers, said fulcrum means being spaced longitudinally of the levers from said free end of the inner lever, the lever system being so arranged relative to the diaphragm and the valve to increase the pressure applied by initial inward movement of the diaphragm to the outer lever to open the valve and to increase the rate of movement of the valve to full open position by continued inward movement of the diaphragm while maintaining a sufficient applied pressure to continue opening of the valve.

2. A respiratory oxygen regulator comprising a housing provided with an oxygen inlet and an oxygen outlet, a depressable valve normally closing said inlet, a diaphragm mounted at the outlet side of the valve and adapted to be drawn toward the valve by inhalation through said outlet, a pair of levers pivoted at one end on opposite sides of the valve and extending across the valve in overlapping relation with the central portion of the inner lever engaging the valve and the free end of the outer lever engaging the diaphragm, the free end of the inner lever normally being operatively connected to the outer lever only at a point close to the pivot of the outer lever, and force-transmitting means between the valve and the free end of the inner lever and projecting from one of the levers toward the other but normally spaced from the latter, said means being adapted to engage said other lever only after the levers have been depressed far enough to unseat the valve, whereupon the rate of movement of the valve to full open position is increased.

3. A respiratory oxygen regulator comprising a housing provided with an oxygen inlet and an oxygen outlet, a depressable valve normally closing said inlet, a diaphragm mounted at the outlet side of the valve and adapted to be drawn toward the valve by inhalation through said outlet, a pair of levers pivoted at one end on opposite sides of the valve and extending across the valve in overlapping relation with the central portion of the inner lever engaging the valve and the free end of the outer lever engaging the diaphragm, the free end of the inner lever normally engaging the outer lever close to the pivot of the latter, and a projection on one of the levers between the valve and the free end of the inner lever and normally spaced from the other lever, said projection being adapted to engage said other lever only after the levers have been depressed far enough to unseat the valve, whereupon the rate of movement of the valve to full open position is increased.

4. A respiratory oxygen regulator comprising a housing provided with an oxygen inlet and an oxygen outlet, a depressable valve normally closing said inlet, a diaphragm mounted at the outlet side of the valve and adapted to be drawn toward the valve by inhalation through said outlet, a pair of levers pivoted at one end on opposite sides of the valve and extending across the valve in overlapping relation with the central portion of the inner lever engaging the valve and the free end of the outer lever engaging the diaphragm, one of the levers having a projection engaging the other lever at the free end of the inner lever, and one of the levers having a projection spaced longitudinally from said first-mentioned projection and formed to engage the other lever only after the levers have been depressed far enough to unseat the valve, whereupon the rate of movement of the valve to full open position is increased.

WILLIAM P. YANT.